P. READING.
FERTILIZER DISTRIBUTING ATTACHMENT.
APPLICATION FILED DEC. 9, 1912.

1,091,163.

Patented Mar. 24, 1914.

2 SHEETS—SHEET 1.

ATTEST
E. M. Fisher
Florence Seller

INVENTOR
Peter Reading
BY Fisher & Moser
ATTYS.

COLUMBIA PLANOGRAPH CO., WASHINGTON, D. C.

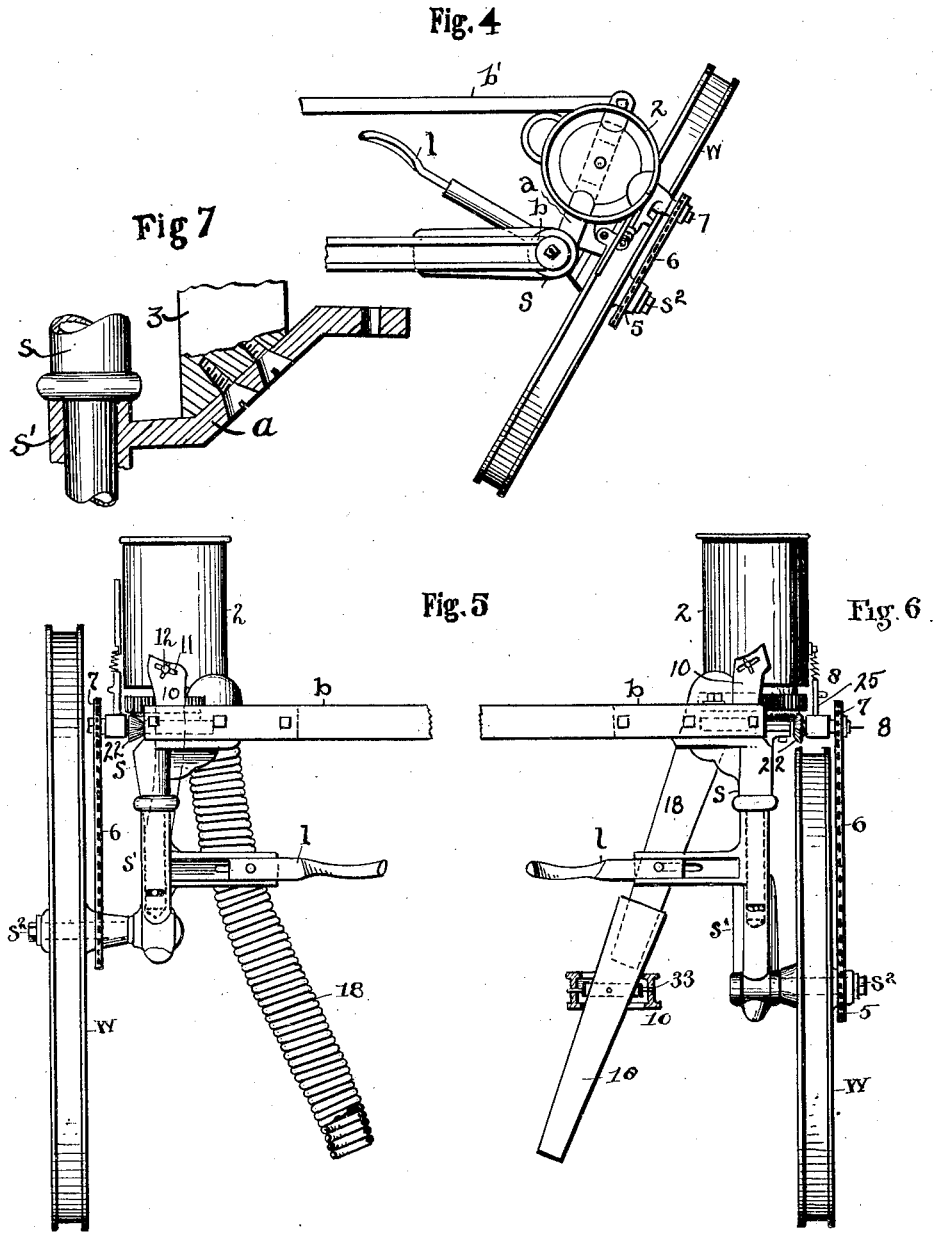

UNITED STATES PATENT OFFICE.

PETER READING, OF AKRON, OHIO, ASSIGNOR TO THE AKRON CULTIVATOR COMPANY, OF AKRON, OHIO, A CORPORATION.

FERTILIZER-DISTRIBUTING ATTACHMENT.

1,091,163.  Specification of Letters Patent.  Patented Mar. 24, 1914.

Application filed December 9, 1912. Serial No. 735,841.

*To all whom it may concern:*

Be it known that I, PETER READING, citizen of the United States, residing at Akron, in the county of Summit and State of Ohio, have invented certain new and useful Improvements in Fertilizer-Distributing Attachments, of which the following is a specification.

This invention relates to a fertilizer distributing attachment adapted to be used on a pivot axle cultivator particularly, although applicable to other types of cultivators, all substantially as shown and described and particularly pointed out in the claims.

Figure 1:
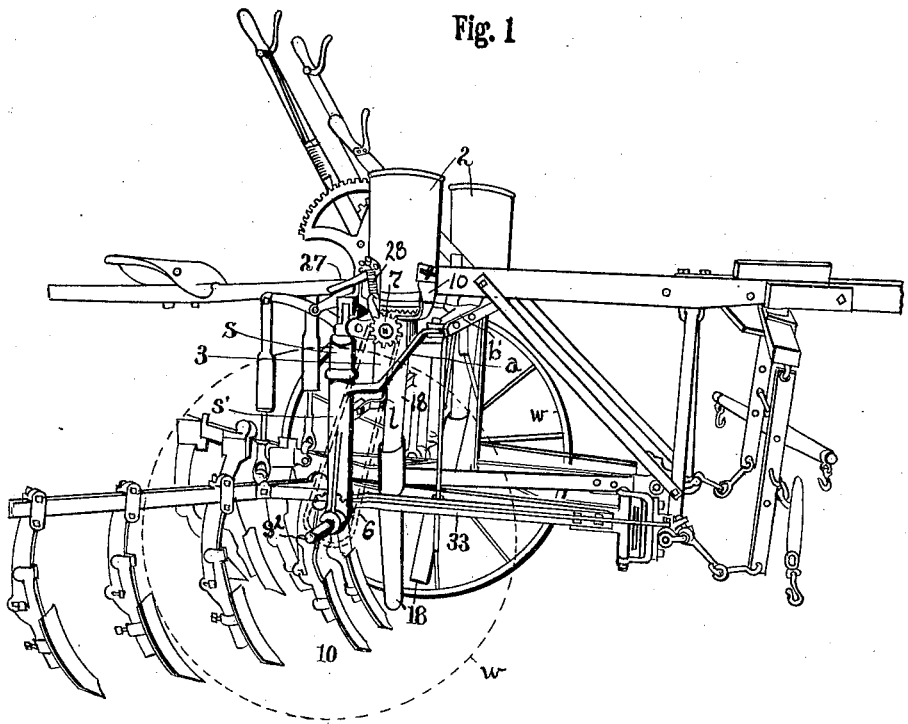
Figure 2:
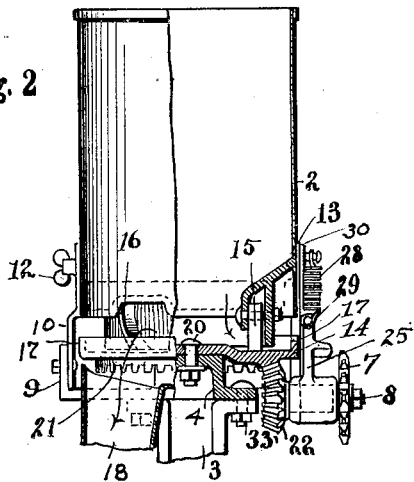
Figure 3:
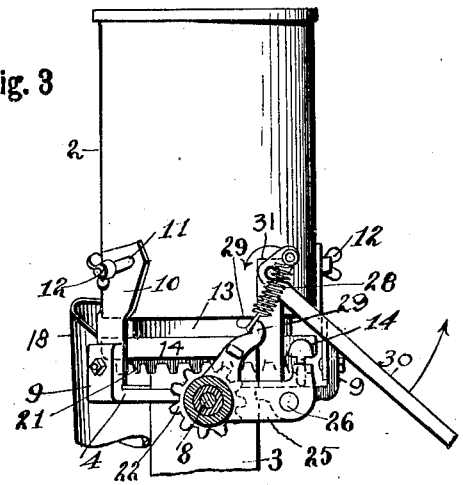

In the accompanying drawings, Figure 1 is a perspective view of a sulky cultivator showing the fertilizer distributer in working relations thereon, but with the near wheel removed. Figs. 2 and 3 are side elevations respectively of the attachment proper from different points of view and partially sectioned. Fig. 4 is a plan view of one side of the cultivator, and Figs. 5 and 6 are rear views of the cultivator, broken out in the middle and showing two kinds of delivery spouts and other features. Fig. 7 is a detail showing the connection between the hopper and the bridge arm.

The cultivator shown herein is of the pivot axle type, and it has not hitherto been found practicable to place a fertilizer distributer on such a machine, because the constantly changing direction of the driving wheels and of the cultivator gangs which are governed by said wheels to adapt them to the deviations of the row that is being cultivated, seemed to leave no place whereon the fertilizer distributer could be operatively placed. But I have discovered that by utilizing the bridge arms as foundation supports and by elevating the distributer thereon to a plane relatively above said wheels so as to effect operating connections over the top thereof I can get both position and operation that is satisfactory. The parts of the cultivator which are involved in this construction are the axle frame consisting of two side standards or supports comprising upper castings $s$ and lower castings $s'$ and a bridge bar $b$ to which the said upper castings are rigidly affixed through the horizontal portion at the top of said upper castings $s$. The said upper castings have each a spindle shaped lower portion forming a vertical axis over which the wheel casting $s'$ is sleeved and adapted to rotate horizontally within limits, and the said lower casting is provided with the wheel spindle $s^2$, the bridge arm $a$ extending upwardly and forwardly from the upper portion thereof, and the steering or guiding lever $l$. By reason of the bridge arms $a$ being integral with the castings $s^2$ of said standard and substantially at right angles to the wheel spindles and parallel with the wheel, it follows that said arms will always hold the same relations to the said spindles and the sulky wheels $w$ thereon whatever turn may be given to the wheels through the levers $l$. The ends of the said arms $a$ are connected by the bridge bar $b'$, and thus the operator is given complete control of the wheels jointly and the bridge arms $a$ turn with the wheels. Now, having utilized the arms $a$ as a base on which to build the said distributing mechanism, I provide a fertilizer receptacle 2 which is rigidly fixed upon a suitable bracket 3 on the arm $a$ by suitable means, it being understood that the bottom of the receptacle is elevated to such position in respect to the wheel $w$ that working connections for the receptacle can be made over the wheel from the outside, if a comparatively low wheel be used as shown in Fig. 6, but if the wheel were high an inside connection could be made as shown in Fig. 5. A sprocket wheel 5 is fixed on the hub of each wheel $w$ and a chain 6 runs over the same and a sprocket wheel 7 on the shaft 8 which operates the feed mechanism in the said receptacle and drives said mechanism.

A spider 4 is fixed upon bracket 3 and has arms with upturned ends 9 upon which the receptacle 2 is rigidly supported by the extensions 10 from said arms and which extensions have inclined slots 11 at their top and bolts 12 through same and the side of the receptacle to fix the receptacle in place. The said slots provide for rotary adjustment of the receptacle to different elevations. The receptacle is shown as having an open casting 13 at its bottom and a dish shaped or flanged bottom proper 14, is rotatably supported on spider 4 beneath said casting 13 and apart from the same say a fourth of an inch, more or less, according to the fertilizer used, and is of a size to stand out apart from said casting 13 about an inch all around to gather fertilizer in said outer space from within the receptacle. The feed from the inside need not be rapid and is effected by means of a pivoted stirrer or finger 15 inside the receptacle running on the surface of the dish bottom 14 and agitating the fertilizer so as to promote its working out into the peripheral open space outside in said bottom 14 and in which a plow 16, fixed in a recess on the outside of casting 13 operates to lift the fertilizer over the flange 17 and out into the delivery spout 18, where it goes to the earth in front of the inner cultivator teeth and near the plants under cultivation. The bottom 14 rotates at the center 20 and has gear teeth 21 on its bottom meshed by the miter gear 22 on shaft 8. The shaft 8 is supported in a bearing on arm 25 pivoted at 26 on the edge of spider 4 and adapted to raise the gear 2 into mesh with gear 21 when the distributer is operated and to lower the same out of mesh when not in operation. To this end a spring link connection 28 is made with a hook 29 on said arm, and hand lever 30 is pivoted on post 31 has a crank projection to which said spring is attached and by which the said lever can be thrown over the center of its pivot either direction to hold said shaft and gear up in one position, Fig. 3, and to lower it when reversed or opposite to Fig. 3.

The spout 18 may be sectional as shown at the right in Fig. 4 or of a spirally wound wire formation as shown at the left in said figure, and in both cases it may have guide relations with the tooth bar 33 of the cultivator.

Both sides of the cultivator are equipped alike with fertilizer attachments, and the said attachments are adapted to be applied to cultivators in use as well as to those that are new, if they be of the type having the supporting arms a.

The attachment as such begins with the bracket 3, which may be a casting or a suitable block or the like removably and rigidly fixed on the arm a between its ends, and in this instance the said bracket is a hollow casting to which the spider 4 is secured by bolts or screws 33'. The said arms being inclined the bracket 3 must accommodate itself to this construction and has an inclined lower portion adapted to set on said arm.

In operation the flanged bottom member 14 having gear teeth 21 on its lower side is rotated while the spider 4 and the receptacle 2 are stationary, and such rotation and feed may be intercepted by throwing gear wheel 22 out of mesh by means of the hand lever 30.

No novelty is claimed herein for the cultivator and its parts as such or separate from the fertilizer attachment and which is specially constructed to work therewith.

What I claim is:

1. A pivot wheel cultivator having horizontally rotatable vertical parts at its sides provided with spindles upon which the wheels are mounted and having bridge arms rigid therewith substantially parallel to said wheels and connected at their ends, fertilizer distributers removably fixed upon said arms and driving connections therewith initially engaged with the hubs of said wheels.

2. A wheel cultivator having a frame consisting of side standards and a cross bar rigidly connecting the upper portions of said standards, rotatable parts constituting the lower portions of said standards provided with wheel spindles and bridge arms projecting forwardly therefrom at an upward inclination and foot levers extending inward relatively opposite said spindles, separate fertilizer receptacles supported upon said arms on a plane relatively above the wheels of the cultivator and provided with shafts extending outward over the said wheels, sprocket mechanism engaged over the hub portions of the said wheels and the ends of said shaft.

3. A wheel cultivator having horizontally rotatable side standards provided with wheel spindles at their lower ends and bridge arms at their upper ends and foot levers between their ends projecting inward, in combination with a fertilizer attachment supported by each of said arms and means to actuate the said attachment having operating connection with the wheels mounted on said spindles.

4. A cultivator having wheels and means to turn the same together in respect to a direct line of travel and rotatable standards having spindles on which said wheels are mounted, forwardly and upwardly projecting arms at the top of said supports and brackets fixed on said arms, in combination with fertilizer distributers fixed upon said brackets and drive mechanism therefor connected with the hubs of said wheels.

In testimony whereof I affix my signature in presence of two witnesses.

PETER READING.

Witnesses:
E. M. FISHER,
W. J. GELINK.

Copies of this patent may be obtained for five cents each, by addressing the "Commissioner of Patents, Washington, D. C."